US008041049B2

(12) United States Patent
Yoshino

(10) Patent No.: US 8,041,049 B2
(45) Date of Patent: Oct. 18, 2011

(54) METHOD FOR CONTROLLING OUTPUT FROM ULTRASONIC SPEAKER AND ULTRASONIC SPEAKER SYSTEM

(75) Inventor: Hiroyuki Yoshino, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1218 days.

(21) Appl. No.: 11/736,066

(22) Filed: Apr. 17, 2007

(65) Prior Publication Data

US 2007/0286433 A1 Dec. 13, 2007

(30) Foreign Application Priority Data

Apr. 18, 2006 (JP) ................................ 2006-114123
Apr. 11, 2007 (JP) ................................ 2007-103687

(51) Int. Cl.
*H04B 3/00* (2006.01)

(52) U.S. Cl. ........................................ 381/77; 381/99

(58) Field of Classification Search .................... 381/82, 381/77, 160, 79, 387, 337, 111, 116, 182, 381/1, 80, 310, 97–99, 101–103; 181/199, 181/175, 139

See application file for complete search history.

(56) References Cited

U.S. PATENT DOCUMENTS

| | | | | |
|---|---|---|---|---|
| 5,687,239 | A * | 11/1997 | Inanaga et al. | 381/309 |
| 6,925,296 | B2 * | 8/2005 | Mattisson | 455/355 |
| 7,016,504 | B1 * | 3/2006 | Shennib | 381/60 |
| 7,123,731 | B2 * | 10/2006 | Cohen et al. | 381/303 |

FOREIGN PATENT DOCUMENTS

| | | | |
|---|---|---|---|
| JP | 2000-004500 | * | 1/2000 |
| JP | 2005-080227 | * | 3/2005 |

* cited by examiner

*Primary Examiner* — Xu Mei
*Assistant Examiner* — Lun-See Lao
(74) *Attorney, Agent, or Firm* — Workman Nydegger

(57) ABSTRACT

The invention maintains optimum sound quality even when a listener changes his/her angle formed between a sound wave emitting axis of an ultrasonic transducer and a front direction axis of the listener with respect to the sound wave emitting axis. An ultrasonic speaker system of the invention includes an angle measuring unit that measures a listener angle as an angle formed between a sound wave emitting axis of the ultrasonic transducer and an axis indicating a listener's front direction; a control information transmitting unit that transmits control information including listener angle information obtained by the angle measuring unit; a control information receiving unit that receives the control information; and a control unit that controls the signal processing performed by a signal processing unit based on the listener angle information included in the control information.

17 Claims, 10 Drawing Sheets

| LISTENER POSITION INFORMATION | LISTENER ANGLE INFORMATION | FILTER TO BE SELECTED |
|---|---|---|
| 0000000 | 0000000 | 001 (FILTER 1) |
| | 0000001 | |
| | · | |
| | · | |
| | 0010100 | |
| | 0010101 | 010 (FILTER 2) |
| | · | |
| | · | |
| | 1000011 | |
| | 1000100 | 011 (FILTER 3) |
| | · | |
| | · | |
| | 1011010 | |
| 0000001 | 0000001 | 001 (FILTER 1) |
| | · | |
| | · | |
| | 0010100 | |
| | 0010101 | |
| | 0010110 | 010 (FILTER 2) |
| | · | |
| | · | |
| | 1000100 | |
| | 1000101 | 011 (FILTER 3) |
| | · | |
| | · | |
| | 1011011 | |
| · · · | · | · · · |
| | · | |
| | · | |
| | · | |

FIG.11

METHOD FOR CONTROLLING OUTPUT FROM ULTRASONIC SPEAKER AND ULTRASONIC SPEAKER SYSTEM

The present invention contains subject matter of specifications, drawings, and abstracts related to Japanese Patent Application JP 2006-114123 filed on Apr. 18, 2006 and Japanese Patent Application JP 2007-103687 filed on Apr. 11, 2007 in the Japanese Patent Office, the entire contents of which being incorporated herein by reference.

BACKGROUND ART

The present invention relates to a method for controlling output from an ultrasonic speaker and an ultrasonic speaker system capable of providing a difference frequency component (self-demodulated sound) having extremely strong directivity due to parametric array effect when emitting a signal as ultrasonic waves modulated by an audio signal from an ultrasonic transducer such as an ultrasonic vibration element.

An ultrasonic speaker is used for providing audio information to only a particular area or for other purposes since the ultrasonic speaker has extremely strong directivity compared with an ordinary speaker. For example, the ultrasonic speaker is equipped in an exhibition hall such as an art museum, thereat the ultrasonic speaker gives explanation about a work only to a person having approached the work and existing within a limited area near the work.

Since sound waves emitted from a speaker of an ordinary audio system are spherical waves, the characteristics of sound pressure level to frequency felt by a listener scarcely vary even when the listener listening the sound changes his/her angle with respect to the sound wave emitting surface of the speaker. However, in case of the ultrasonic speaker, sound waves generated from an ultrasonic transducer are plane waves. Thus, the characteristics of sound pressure level to frequency felt by the listener considerably vary when the listener listening the sound changes his/her angle with respect to the sound wave emitting axis of the ultrasonic transducer.

An example of this variation in the characteristics of sound pressure level to frequency is now discussed. It is assumed that the angle formed between an axis indicating the listener's front direction (hereinafter referred to as listener front direction axis) and the sound wave emitting axis of the ultrasonic transducer is 90 degrees, and that the left ear of the listener is positioned closer to the ultrasonic transducer than the right ear (this condition is hereinafter referred to as condition A). From this position, the listener gradually rotates anticlockwise until the angle mentioned above becomes 180 degrees (condition after 180° rotation is hereinafter referred to as condition C). Based on these assumptions, the self-demodulated sound entering the right ear of the listener is now examined. As the listener approaches the condition C in the anticlockwise direction from the condition A, the sound pressure level of the self-demodulated sound in the audio frequency band gradually increases. The increase rate of the sound pressure level is greater at a lower frequency. In this case, the characteristics of sound pressure level to frequency of the self-demodulated sound entering the left ear vary oppositely to the case of the right ear discussed above.

For improving the sound quality in the ordinary audio system, it is necessary to flat the characteristics of sound pressure level to frequency by filtering the audio signal or by other methods. However, in case of the ultrasonic speaker, unlike the case of the ordinary speaker, the characteristics of sound pressure level to frequency felt by the listener considerably vary when the listener listening the sound changes his/her angle with respect to the sound wave emitting axis of the ultrasonic transducer as explained above. Thus, when the ultrasonic speaker system is included in an application used by a listener whose listening position and angle are variable with respect to the sound wave emitting surface of the ultrasonic transducer according to possible conditions, the filter characteristics in filtering the audio signal are required to be varied in accordance with the current position and angle of the listener so that signal processing such as flatting the characteristics of frequency can be appropriately performed.

In order to meet this requirement, there is proposed an audio information providing method and a directivity-type audio information providing apparatus which can provide a sound space having high directivity, and further shift the sound space and vary information to be provided according to the position and movement of a target person (refer to Patent Document 1).

According to this audio information providing apparatus, the space range for providing audio information and the contents of the audio information to be provided are dynamically varied by using position determining means for determining the position of the target person and audio information output means for outputting audio information while tracing the target person based on the output from the position determining means.

[Patent Document 1] JP-A-2005-80227

This audio information providing apparatus provides the optimum sound space for the listener by controlling the angle of the sound wave emitting axis of the ultrasonic transducer according to the position of the listener and varying the frequency of carrier waves according to the distance from the listener. However, this related-art apparatus does not consider the angle of the listener with respect to the sound wave emitting axis of the ultrasonic transducer. Thus, there is a problem in that when the listener listening the sound changes his/her angle to the sound wave emitting axis of the ultrasonic transducer, the related-art apparatus cannot provide the optimum sound quality for the listener.

The present invention has been made in view of the above circumstance, and an object of the invention is to provide a method for controlling output from an ultrasonic speaker and an ultrasonic speaker system capable of constantly obtaining the optimum sound quality even when a listener changes his/her angle formed between a sound wave emitting axis of an ultrasonic transducer and a front direction axis of the listener with respect to the sound wave emitting axis.

DISCLOSURE OF THE INVENTION

In order to attain the above object, a method for controlling output from an ultrasonic speaker according to the invention includes modulating carrier waves by signal waves outputted from a signal source that generates signal waves in an audio frequency band, and driving an ultrasonic transducer by the modulated waves. Signal processing is applied to the signal waves in the audio frequency band according to an angle formed between a sound wave emitting axis of the ultrasonic transducer and an axis indicating a listener's front direction.

According to the method for controlling output from the ultrasonic speaker having this structure, the signal processing applied to the signal waves in the audio frequency band is performed according to the angle formed between the sound wave emitting axis of the ultrasonic transducer and the axis indicating the listener's front direction in order to obtain desired output characteristics. Thus, when the listener listens to the sound at a predetermined angle formed between the sound wave emitting axis of the ultrasonic transducer and the axis indicating the listener's front direction, the optimum sound quality at that angle can be provided for the listener.

In addition, the method for controlling output from the ultrasonic transducer according the invention further includes an angle measuring unit that measures an angle formed between an axis indicating an arbitrary reference direction and the axis indicating the listener's front direction, and the signal processing is applied based on a measurement result of the angle measuring unit.

According to the method for controlling output from the ultrasonic transducer having this structure, the signal processing (filtering process) is applied to the signal waves in the audio frequency band by using the angle measuring unit for measuring the angle formed between the axis indicating the arbitrary reference direction and the axis indicating the listener's front direction based on the measurement result of the angle measuring unit such that desired output characteristics can be constantly obtained when the angle formed between the sound wave emitting axis of the ultrasonic transducer and the axis indicating the listener's front direction varies. Thus, even when the listener changes his/her front direction with respect to the sound wave emitting axis of the ultrasonic transducer, the optimum sound quality can be provided for the listener at all times.

In addition, the method for controlling output from the ultrasonic transducer according the invention further includes a sound wave emitting axis direction varying unit that arbitrarily varies the direction of the sound wave emitting axis, and a position determining unit that determines the position of the listener with respect to the ultrasonic transducer. The sound wave emitting axis direction varying unit controls the direction of the sound wave emitting axis such that the sound wave emitting axis crosses the listener based on a measurement result of the position determining unit, and the signal processing is performed based on the measurement result of the angle measuring unit and the measurement result of the position determining unit.

The method for controlling output from the ultrasonic speaker having this structure uses the position determining unit for determining the position of the listener with respect to the ultrasonic transducer. When the listener changes his/her position with respect to the ultrasonic transducer, the sound wave emitting axis direction varying unit controls the direction of the sound wave emitting axis such that the sound wave emitting axis of the ultrasonic transducer crosses the listener based on the measurement result of the position determining unit. The signal processing is performed based on the measurement result of the angle measuring unit and the measurement result of the position determining unit. Thus, the sound waves emitted from the ultrasonic transducer can be constantly provided for the listener even when the listener changes his/her position with respect to the ultrasonic transducer. In addition, even when the listener changes his/her position with respect to the sound wave emitting axis of the ultrasonic transducer, the sound quality provided for the listener in various conditions constantly becomes the optimum for each condition.

In addition, in the method for controlling output from the ultrasonic transducer according to the invention, the signal processing is performed such that frequency characteristics of a signal sound in the audio frequency band which is self-demodulated when emitted from the ultrasonic speaker can be made flat for each angle formed between the sound wave emitting axis and the axis indicating the listener's front direction.

According to the method for controlling output from the ultrasonic transducer having this structure, the signal processing is performed such that the frequency characteristics of the signal sound in the audio frequency band which is self-demodulated when emitted from the ultrasonic speaker can be made flat for each angle formed between the sound wave emitting axis of the ultrasonic transducer and the axis indicating the listener's front direction. Thus, the contents of the signal processing applied to the signal waves in the audio frequency band can be determined.

In addition, in the method for controlling output from the ultrasonic transducer according to the invention, the signal processing is performed such that the frequency characteristics of the signal sound in the audio frequency band which is self-demodulated when emitted from the ultrasonic speaker can be made flat in a band equivalent to or higher than a frequency according to each angle formed between the sound wave emitting axis of the ultrasonic transducer and the axis indicating the listener's front direction. According to the method for controlling output from the ultrasonic transducer having this structure, that the signal processing is performed such that the frequency characteristics of the signal sound in the audio frequency band which is self-demodulated when emitted from the ultrasonic speaker can be made flat in the band equivalent to or higher than the frequency according to each angle formed between the sound wave emitting axis of the ultrasonic transducer and the axis indicating the listener's front direction. Thus, the contents of the signal processing applied to the signal waves in the audio frequency band can be determined.

An ultrasonic speaker system according to the invention includes a signal source that generates signal waves in an audio frequency band, a signal processing unit that applies signal processing to the signal waves, a signal wave amplitude adjusting circuit that adjusts amplitude of the signal waves, a carrier wave generating source that generates and outputs carrier waves in an ultrasonic frequency band, a modulating circuit that modulates the carrier waves by the signal waves in the audio frequency band outputted from the signal source, a modulated wave amplitude adjusting circuit that adjusts amplitude of the modulated waves produced by the modulating circuit, an ultrasonic transducer driven by the modulated waves whose amplitude is adjusted by the modulated wave amplitude adjusting circuit, an angle measuring unit that measures a listener angle as an angle formed between an axis indicating an arbitrary reference direction and an axis indicating a listener's front direction, a control information transmitting unit that transmits control information including listener angle information obtained by the angle measuring unit, a control information receiving unit that receives the control information, and a control unit that controls the signal processing performed by the signal processing unit based on the listener angle information included in the control information. According to the ultrasonic speaker system having this structure, the angle measuring unit measures the listener angle as the angle formed between the axis indicating the arbitrary reference direction and the axis indicating the listener's front direction, and the control information transmitting unit transmits the control information containing the listener angle information obtained by the angle measuring unit. Then, the control information receiving unit receives the control information transmitted from the control information transmitting unit, and the control unit controls the signal processing executed by the signal processing unit based on the listener angle information contained in the control information. Thus, when the listener listens to the sound at a determined angle formed between the sound wave emitting axis of the ultrasonic transducer and the axis indicating the listener's front direction, the optimum sound quality at that angle can be provided for the listener.

In addition, in the ultrasonic speaker system according to the invention, the control unit includes a table storage unit that stores a table showing the relation between the listener angle information included in the control information and the signal processing performed by the signal processing unit, and that the control unit refers to the table based on the listener angle information to determine the contents of the signal processing when controlling the signal processing.

According to the ultrasonic speaker system having this structure, the control unit includes the table storage unit that stores the table showing the relation between the listener angle information included in the control information and the signal processing performed by the signal processing unit, and the control unit refers to the table based on the listener angle information included in the control information to determine the contents of the signal processing when controlling the signal processing. Thus, the contents of the signal processing applied to the signal waves in the audio frequency band can be determined.

In addition, in the ultrasonic speaker system according to the invention, the signal processing unit has a plurality of filters prepared in correspondence with the listener angle information, and that the control unit selects one of the plural filters. According to the ultrasonic speaker system having this structure, the signal processing unit has a plurality of filters prepared in correspondence with the listener angle information, and the control unit selects one of the plural filters. Thus, the optimum sound quality with excellent response capability can be constantly provided for the listener even when the listener changes his/her front direction with respect to the sound wave emitting axis of the ultrasonic transducer.

In addition, the ultrasonic speaker system according to the invention further includes an angle varying mechanism that arbitrarily varies an angle of the sound wave emitting axis of the ultrasonic transducer, a position determining unit that determines a listener position as a position of the listener with respect to the ultrasonic transducer, and an angle control unit that controls the operation of the angle varying mechanism such that the angle of the ultrasonic transducer can be varied based on listener position information obtained by the position determining unit and contained in the control information transmitted from the control information transmitting unit. In this ultrasonic speaker system, the control unit controls the signal processing based on the two types of information of the listener angle information and the listener position information.

According to the ultrasonic speaker system having this structure, the position determining unit determines the listener position as the position of the listener with respect to the ultrasonic transducer. The control information transmitted from the control information transmitting unit further contains the listener position information obtained by the position determining unit. The angle control unit controls the operation of the angle varying mechanism for arbitrary varying the angle of the sonic transducer such that the angle of the ultrasonic transducer can be varied based on the listener position information. The control unit controls the signal processing executed by the signal processing unit based on the two types of information of the listener angle information and the listener position information. Thus, the sound waves emitted from the ultrasonic transducer can be constantly provided for the listener even when the listener changes his/her position with respect to the ultrasonic transducer. In addition, even when the listener changes his/her position with respect to the sound wave emitting axis of the ultrasonic transducer, the sound quality provided for the listener in various conditions constantly becomes the optimum for each condition.

In addition, in the ultrasonic speaker system according to the invention, the control unit includes a table storage unit that stores a table showing the relation between the signal processing performed by the signal processing unit and the listener angle information and the listener position information contained in the control information, and that the control unit refers to the table based on the listener angle information and the listener position information contained in the control information to determine the contents of the signal processing when controlling the signal processing.

According to the ultrasonic speaker system having this structure, the control unit includes the table storage unit that stores the table showing the relation between the listener angle information and the listener position information contained in the control information and the signal processing (filtering process) performed by the signal processing unit, and the control unit refers to the table based on the listener angle information and the listener position information contained in the control information to determine the contents of the signal processing applied to the signal waves in the audio frequency band when controlling the filtering process applied to the signal waves in the audio frequency band. Thus, the contents of the signal processing applied to the signal waves in the audio frequency band can be determined.

In addition, in the ultrasonic speaker system according to the invention, the signal processing unit has a plurality of filters prepared in correspondence with the listener angle information and the listener position information contained in the control information, and that the control unit selects one of the plural filters when executing the signal processing.

According to the ultrasonic speaker system having this structure, the signal processing unit has the plural filters prepared in correspondence with the listener angle information and the listener position information contained in the control information, and the control unit selects one of the plural filters when executing the signal processing. Thus, the optimum sound quality with excellent response capability can be constantly provided for the listener even when the listener changes his/her front direction with respect to the sound wave emitting axis of the ultrasonic transducer.

In addition, in the ultrasonic speaker system according to the invention, the signal processing unit executes the signal processing such that frequency characteristics of a signal sound in the audio frequency band which is self-demodulated when emitted from the ultrasonic speaker can be made flat for the angle formed between the sound wave emitting axis of the ultrasonic transducer and the axis indicating the listener's front direction and obtained from the listener angle information and the listener position information.

According to the ultrasonic speaker system having this structure, the signal processing unit executes the signal processing such that frequency characteristics of the signal sound in the audio frequency band which is self-demodulated when emitted from the ultrasonic speaker can be made flat for the angle formed between the sound wave emitting axis of the ultrasonic transducer and the axis indicating the listener's front direction and obtained from the listener angle information and the listener position information. Thus, the optimum sound quality can be constantly provided for the listener even when the listener changes his/her front direction with respect to the sound wave emitting axis of the ultrasonic transducer.

In addition, in the ultrasonic speaker system according to the invention, the plural filters are prepared such that the frequency characteristics of the signal sound in the audio frequency band which is self-demodulated when emitted from the ultrasonic speaker can be made flat for the angle formed between the sound wave emitting axis of the ultrasonic transducer and the axis indicating the listener's front direction and obtained from the listener angle information and the listener position information.

According to the ultrasonic speaker system having this structure, each of the plural filters is prepared such that the frequency characteristics of the signal sound in the audio frequency band which is self-demodulated when emitted from the ultrasonic speaker can be made flat for the corresponding angle formed between the sound wave emitting axis of the ultrasonic transducer and the axis indicating the listener's front direction and obtained from the listener angle information and the listener position information. Thus, the optimum sound quality can be constantly provided for the listener even when the listener changes his/her front direction with respect to the sound wave emitting axis of the ultrasonic transducer.

In addition, in the ultrasonic speaker system according to the invention, that the signal processing unit executes the signal processing such that the frequency characteristics of the signal sound in the audio frequency band which is self-demodulated when emitted from the ultrasonic speaker can be made flat in a band equivalent to or higher than a frequency according to the angle formed between the sound wave emitting axis of the ultrasonic transducer and the axis indicating the listener's front direction and obtained from the listener angle information and the listener position information.

According to the ultrasonic speaker system having this structure, the signal processing unit executes the signal processing such that the frequency characteristics of the signal sound in the audio frequency band which is self-demodulated when emitted from the ultrasonic speaker can be made flat in a band equivalent to or higher than a frequency according to the angle formed between the sound wave emitting axis of the ultrasonic transducer and the axis indicating the listener's front direction and obtained from the listener angle information and the listener position information. Thus, the optimum sound quality can be constantly provided for the listener according to the sense of hearing of the listener even when the listener changes his/her front direction with respect to the sound wave emitting axis of the ultrasonic transducer.

In addition, in the ultrasonic speaker system according to the invention, the plural filters are prepared such that the frequency characteristics of the signal sound in the audio frequency band which is self-demodulated when emitted from the ultrasonic speaker can be made flat in a band equivalent to or higher than a frequency according to the angle formed between the sound wave emitting axis of the ultrasonic transducer and the axis indicating the listener's front direction obtained from the listener angle information and the listener position information.

According to the ultrasonic speaker system having this structure, the plural filters are prepared such that the frequency characteristics of the signal sound in the audio frequency band which is self-demodulated when emitted from the ultrasonic speaker can be made flat in a band equivalent to or higher than a frequency according to the angle formed between the sound wave emitting axis of the ultrasonic transducer and the axis indicating the listener's front direction and obtained from the listener angle information and the listener position information. Thus, the optimum sound quality can be constantly provided for the listener according to the sense of hearing of the listener even when the listener changes his/her front direction with respect to the sound wave emitting axis of the ultrasonic transducer.

BRIEF DESCRIPTION OF THE DRAWINGS

FIG. 11 illustrates contents of a table showing the relationship between listener position information and listener angle information contained in control information outputted from the control information transmitting unit and select signals outputted from a signal process control unit for specifying a filter to be selected.

BEST MODE FOR CARRYING OUT THE INVENTION

Figure 1:
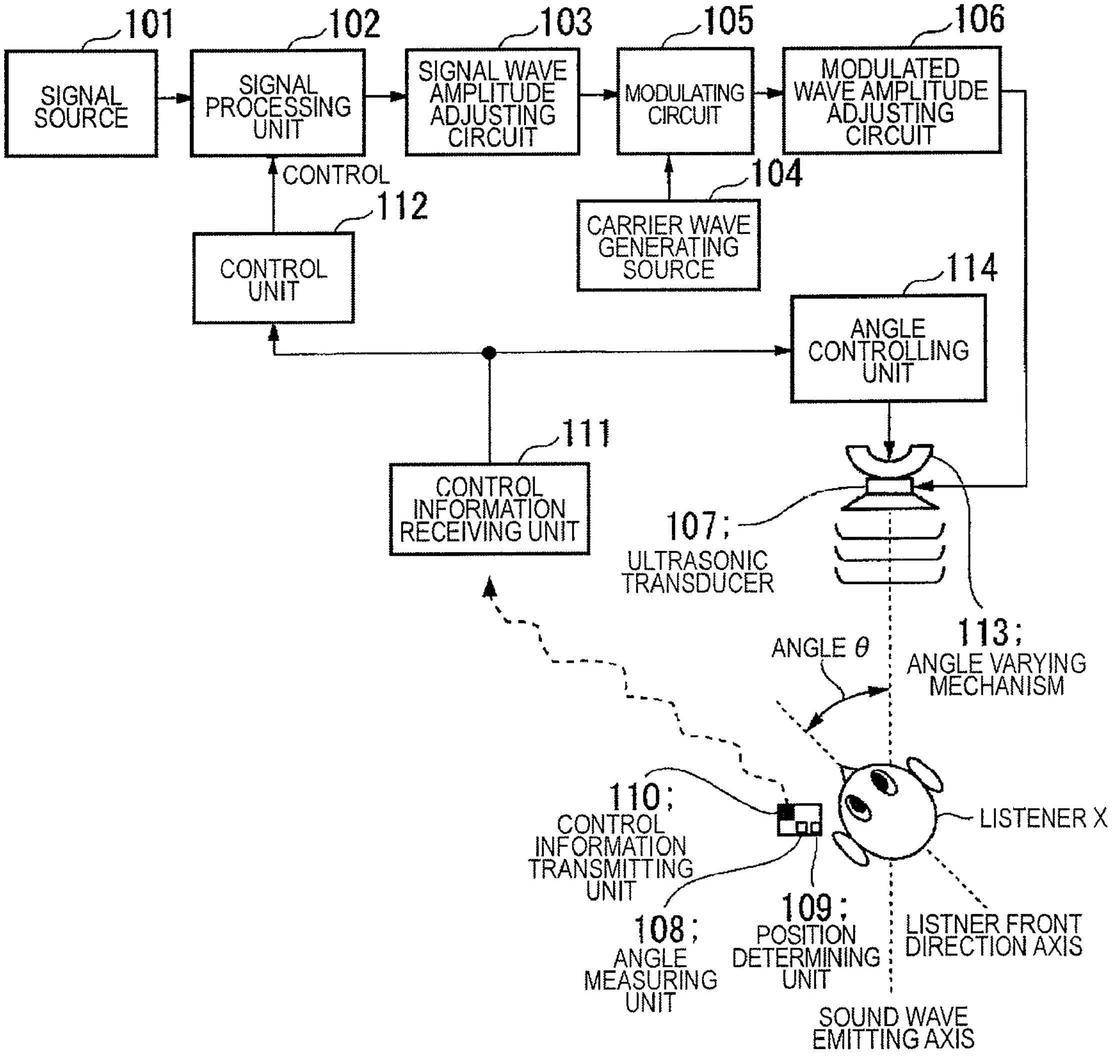
FIG. 1 is a block diagram showing a structure of an ultrasonic speaker system in an embodiment according to the invention.

An embodiment according to the invention is hereinafter described in detail with reference to the drawings. FIG. 1 shows a structure of an ultrasonic speaker system according to the embodiment of the invention. As described above, it is generally necessary to flat the characteristics of sound pressure level to frequency by executing signal processing such as filtering an audio signal so as to improve the sound quality of an audio system. However, in case of the ultrasonic speaker, unlike the case of the ordinary speaker, the characteristics of sound pressure level to frequency felt by the listener considerably vary when the listener changes the angle formed between the sound wave emitting axis of the ultrasonic transducer and the axis indicating a listener's front direction with respect to the sound wave emitting axis.

In order to solve this problem, the ultrasonic speaker system according to the embodiment of the invention obtains desirable output characteristics for each angle formed between the sound wave emitting axis of the ultrasonic transducer and the axis indicating the front direction of the listener by applying a filtering process to signal waves in an audio frequency band according to each angle mentioned above so as to constantly provide the optimum sound quality for the listener even when the listener changes his/her angle with respect to the sound wave emitting axis of the ultrasonic transducer.

As shown in FIG. 1, and as to be understood hereafter when referring to an angle formed between axes, the angle formed between the sound wave emitting axis and the axis indicating the front direction of the listener is measured between a first plane containing the sound wave emitting axis and a second plane containing the axis indicating the listener's front direction, the first and second planes being normal to a reference floor plane (not shown) on which the listener is standing.

As shown in FIG. 1, the ultrasonic speaker system according to the embodiment of the invention includes a signal source 101, a signal processing unit 102, a signal wave amplitude adjusting circuit 103, a carrier wave generating source 104, a modulating circuit 105, a modulated wave amplitude adjusting circuit 106, an ultrasonic transducer 107, an angle measuring unit 108, a position determining unit 109, a control information transmitting unit 110, a control information receiving unit 111, a control unit 112, an angle varying mechanism 113, and an angle controlling unit 114. The signal source 101 generates signal waves in an audio frequency band (audio signal, for example), and outputs the signal waves. The signal processing unit 102 applies signal processing to the signal waves (filtering process, for example). The signal wave amplitude adjusting circuit 103 adjusts the amplitude of the signal waves. The carrier wave generating source 104 generates carrier waves in an ultrasonic wave frequency band, and outputs the carrier waves. The modulating circuit 105 modulates the carrier waves outputted from the carrier wave generating source 104 by the signal waves in the audio frequency band outputted from the signal source 101.

The modulated wave amplitude adjusting circuit 106 adjusts the amplitude of the modulated waves generated from the modulating circuit 105. The modulated wave amplitude adjusting circuit 106 corresponds to a modulated wave amplitude adjusting unit of the invention.

The ultrasonic transducer 107 is driven by the modulated waves whose amplitude is adjusted by the modulated wave amplitude adjusting circuit 106. The ultrasonic transducer 107 has a function for self-demodulating a signal sound within an audio frequency band in the air.

The angle measuring unit 108 has a function for measuring an angle formed between an axis in a reference direction and an axis indicating the front direction of a listener of the ultrasonic speaker (hereinafter referred to as listener angle). Or, more precisely and as to be understood hereafter when referring to the listener angle, the listener angle is formed between a third plane (not shown) that is normal to the reference floor plane (not shown) and that contains an axis in the reference direction and the second plane containing the axis indicating the listener's front direction.

The position determining unit 109 has a function for determining the position of the listener with respect to the ultrasonic transducer 107 (hereinafter referred to as listener position).

The control information transmitting unit 110 has a function for transmitting control information including the "listener angle information" obtained by the angle measuring unit 108 and the "listener position information" obtained by the position determining unit 109. The control information receiving unit 111 has a function for receiving this control information.

The control unit 112 controls a filtering process executed by the signal processing unit 102 based on the "listener angle information" and the "listener position information" included in the control information.

The angle varying mechanism 113 is so structured as to arbitrarily control the angle of the sound wave emitting axis of the ultrasonic transducer 107.

The angle controlling unit 114 has a function for controlling the operation of the angle varying mechanism based on the "listener position information" obtained by the position determining unit 109.

Figure 4:
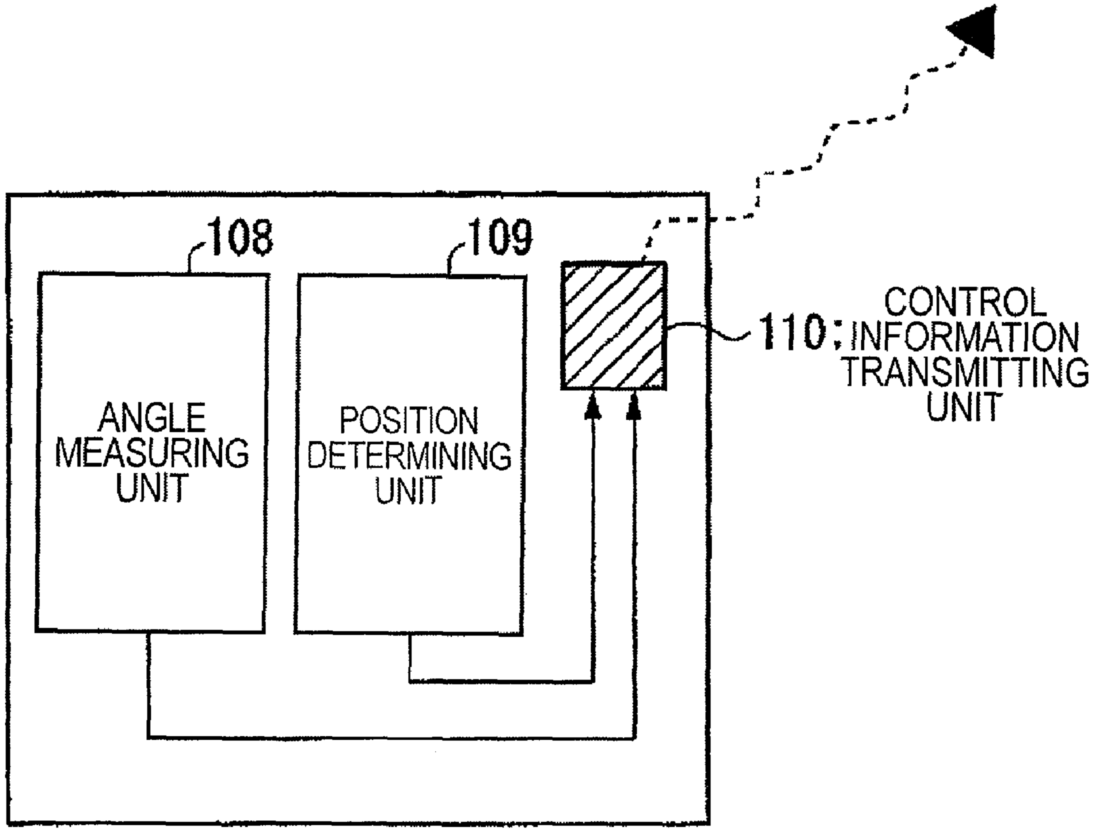
FIG. 4 illustrates a card containing an angle measuring unit, a position determining unit, and a control information transmitting unit.
Figure 5A:
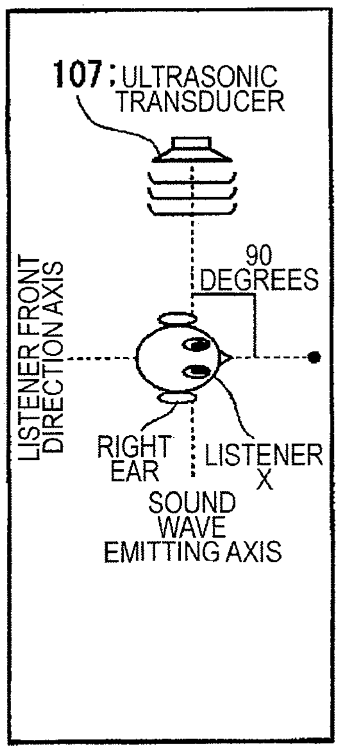
FIG. 5 illustrates conditions where the listener changes his/her angle with respect to the sound wave emitting axis of the ultrasonic transducer, and the relationship between the respective conditions and frequency characteristics felt by the listener.
Figure 5B:
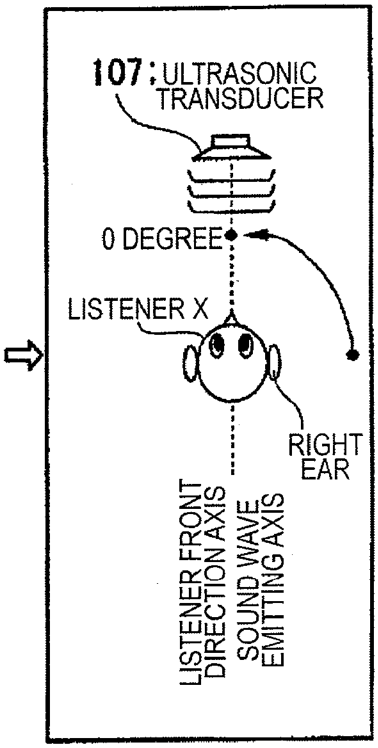
Figure 5C:
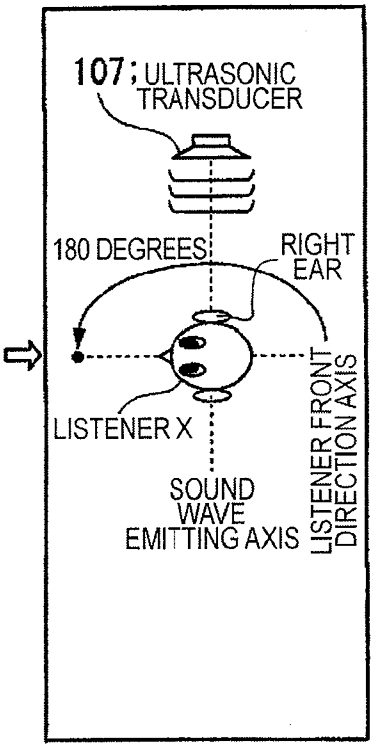
Figure 5D:
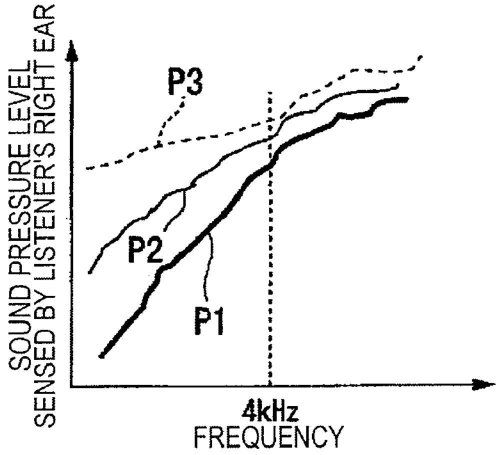

In this embodiment, the angle measuring unit 108, the position determining unit 109, and the control information transmitting unit 110 are contained in a card shown in FIG. 4 and attached to a listener X. The angle measuring unit 108 and the position determining unit 109 will be described in detail later.

The operation of the ultrasonic speaker system having this structure according to the embodiment of the invention is now discussed. It is assumed that an audio signal is produced from the signal source 101 and that carrier waves in an ultrasonic band are generated from the carrier wave generating source 104 in the above structure.

The audio signal produced from the signal source 101 is processed by the signal processing unit 102 so as to obtain desired output characteristics. The contents of the signal processing will be explained in detail later. The audio signal processed by the signal processing unit 102 is sent to the signal wave amplitude adjusting circuit 103, where the amplitude of the audio signal is adjusted.

The modulating circuit 105 has a function for modulating the carrier waves outputted from the carrier wave generating source 104 by the audio signal outputted from the signal wave amplitude adjusting circuit 103. The method of modulation may be amplitude modulation, frequency modulation, or other various methods. In this embodiment, the modulating circuit 105 executes amplitude modulation as an example of the modulation method since the amplitude modulation method is used in a typical ultrasonic speaker system. There are various types such as DSB (double side band) and SSB (single side band) systems in amplitude modulation. It is generally known that the SSB system can reduce distortion of self-demodulated sound more than the DBS system.

More specifically, in the DSB system, the distortion rate of the demodulated signal increases as the degree of modulation of modulated waves for driving the ultrasonic speaker increases. In the SSB system, however, the distortion rate of the demodulated signal is substantially constant regardless of the degree of modulation of the modulated waves for driving the ultrasonic speaker, and the distortion rate of the SSB system is smaller than that of the DSB system. Thus, the modulating circuit 105 executes the amplitude modulation by the SSB system as an example of the modulation method in this embodiment.

The amplitude of the modulated waves outputted from the modulating circuit 105 is adjusted by the modulated wave amplitude adjusting circuit 106. Then, the ultrasonic transducer 107 is driven by the modulated waves outputted from the modulated wave amplitude adjusting circuit 106, and a sound signal in the ultrasonic frequency band is emitted from the ultrasonic transducer 107. By the distortion of the modulated waves in the air, the audio signal discussed above is self-demodulated as a difference frequency component, and heard as audible sound. In this embodiment, the person who listens to the sound waves emitted from the ultrasonic speaker is referred to as a listener X.

Unlike the case of the ordinary speaker, the sound waves emitted from the ultrasonic transducer of the ultrasonic speaker are plane waves. Thus, when the listener listening the sound changes his/her angle with respect to the sound wave emitting axis of the ultrasonic transducer, the characteristics of sound pressure level to frequency felt by the listener considerably vary. Therefore, the contents of the signal processing for providing the optimum sound quality for the listener differ for each angle formed between the sound wave emitting axis of the ultrasonic transducer and the axis indicating the listener's front direction.

The followings are specific examples of the conditions where the angle formed between the sound wave emitting axis of the ultrasonic transducer and the axis indicating the front direction of the listener varies, that is, the listener changes his/her angle with respect to the sound wave emitting surface of the ultrasonic transducer.

Figure 2:
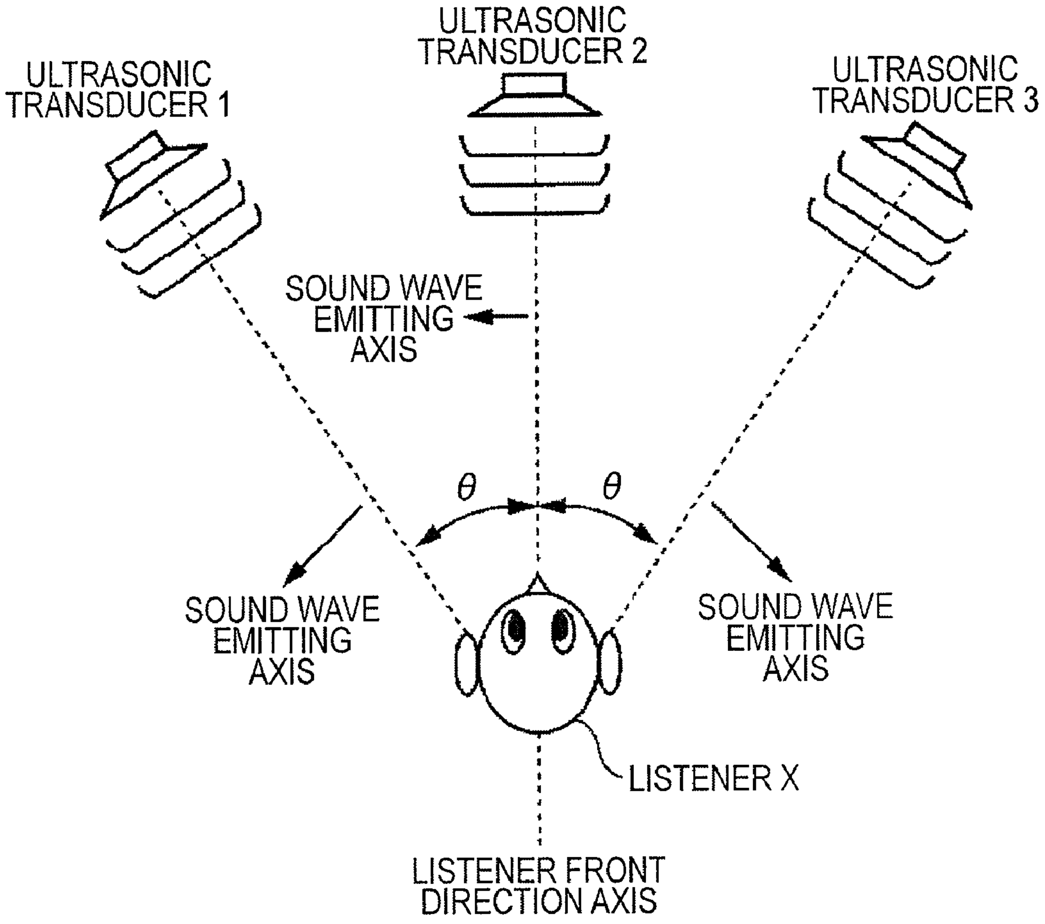
FIG. 2 illustrates a condition where a listener listens to high-directivity sound waves emitted from three fixed ultrasonic transducers.

(1) The listener X listens to high-directivity sound waves emitted from three ultrasonic transducers 1 through 3 as illustrated in FIG. 2 with the angle of the sound wave emitting axis of the ultrasonic transducer and the sound wave listening angle and position of the listener X fixed. The respective ultrasonic transducers 1 through 3 in FIG. 2 are fixed, and the position of the listener X listening the sound waves is also fixed. In this case, the listener X listens to the high-directivity sound waves emitted from the ultrasonic transducers 1 and 3 at an angle different from the angle at which the listener listens to the high-directivity sound waves emitted from the ultrasonic transducer 2. Thus, as discussed above, the contents of the signal processing of the transducers 1 and 3 for providing the optimum sound quality for the listener X differ from those of the transducer 2.

(2) The listener X moves to an arbitrary place with the angle of the sound wave emitting axis of the ultrasonic transducer and the sound wave listening position and angle of the listener X varied. In this case, the angle of the sound wave emitting axis of the ultrasonic transducer is adjusted such that the sound waves can be constantly provided for the listener X. For example, the listener X moves from a position shown in FIG. 3(*a*) to a position shown in FIG. 3(*b*), and the angle of the sound wave emitting axis of the ultrasonic transducer is adjusted such that the sound wave emitting axis is directed to the listener X.

Figure 3A:
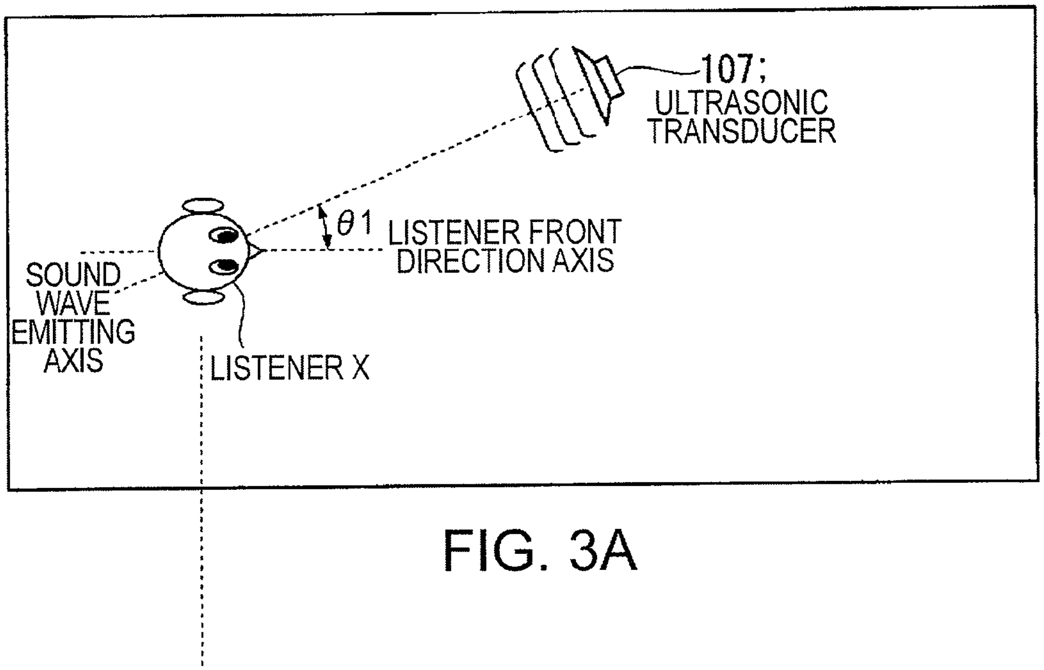
FIG. 3 shows conditions where the angle of the sound wave emitting axis of the ultrasonic transducer is controlled according to movement of the listener.
Figure 3B:
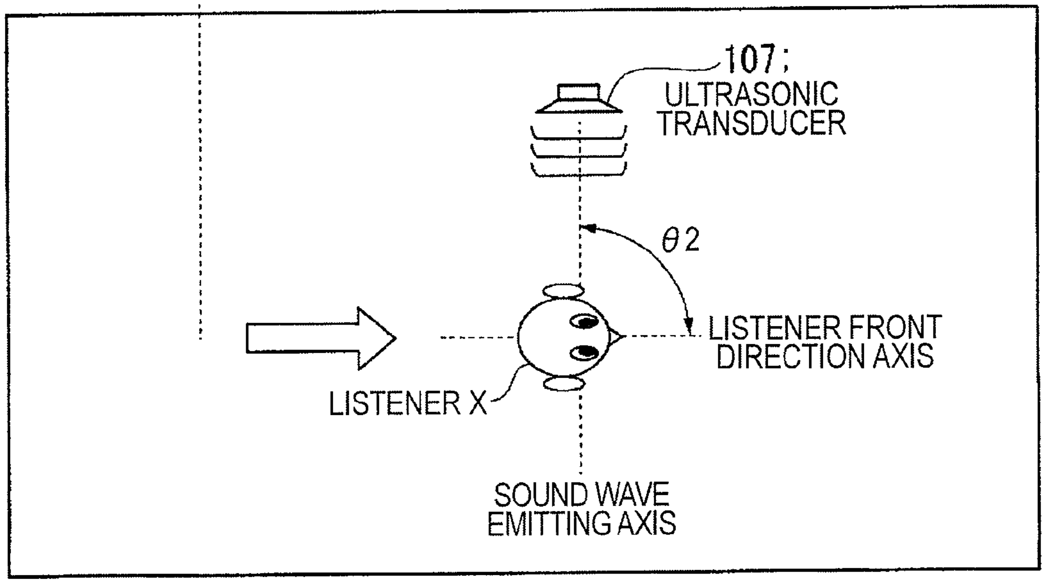

In this case, the angle formed between the sound wave emitting axis of the ultrasonic transducer 107 and the axis of the front direction of the listener X shown in FIG. 3(*a*) is different from that angle shown in FIG. 3(*b*). Thus, as explained above, the contents of the signal processing for providing the optimum sound quality for the listener in the conditions shown in FIGS. 3(*a*) and (*b*) differ from each other. Assuming that these conditions are given, the card containing the angle measuring unit 108 and the position determining unit 109 shown in FIG. 4 is attached to the listener X of the ultrasonic transducer 107 as mentioned above in this embodiment.

The angle varying mechanism 113 carries out adjustment of the angle of the ultrasonic transducer such that the sound waves can be constantly emitted toward the listener X under the control of the angle controlling unit 114 based on the position information about the listener X obtained from the card shown in FIG. 4. The control unit 112 determines the contents of the signal processing to be applied to the audio signal as the signal waves outputted from the signal source 101 based on the angle information measured by the angle measuring unit 108 and the position information determined by the position determining unit 109 about the listener X. Then, the signal processing unit 102 practically applies the determined signal processing to the audio signal.

The control information including the "listener angle information" obtained by the angle measuring unit 108 and the "listener position information" obtained by the position determining unit 109 is transmitted from the control information transmitting unit 110.

Specific examples of the angle measuring unit 108 and the position determining unit 109 shown in FIG. 4 are now described. The angle measuring unit 108 is constituted by a gyro sensor (size example: 5×3.2×1.3 mm), for example. The gyro sensor measures the angle formed between an axis indicating a certain reference direction and the axis indicating the listener's front direction as the "listener angle information". Thus, the information about the direction of the axis indicating the listener's front direction can be acquired from the "listener angle information" obtained by the gyro sensor. The "listener angle information" is outputted from the control information transmitting unit 110. The position determining unit 109 is constituted by a GBS antenna (size example: 6×4×4 mm) for a cellular phone, and the position of the listener is determined by GPS when the ultrasonic speaker system is used outdoors.

In case of indoor use, however, it is difficult at present to determine the position of the listener by GPS because of its insufficient accuracy inside doors or for other reasons. Thus, when the ultrasonic speaker system is used indoors, a plurality of small base stations emitting radio waves are provided indoors in this embodiment. The source for emitting radio waves is provided by utilizing radio LAN, for example. The position of the user existing indoors can be determined by receiving the radio waves from the plural small base stations using the GPS antenna embedded in the card shown in FIG. 4.

The information obtained through the GPS antenna is outputted from the control information transmitting unit 110 as the "listener position information". The information about the direction of the sound wave emitting axis of the ultrasonic transducer can be acquired from the "listener position information". The control information is received by the control information receiving unit 111.

Variation in the characteristics of sound level to frequency felt by the listener caused when the listener listening the sound changes his/her angle with respect to the sound wave emitting axis of the ultrasonic transducer is now discussed.

As illustrated in FIG. 5(*a*), the listener is located at a position where the angle formed between the listener's front direction axis and the sound wave emitting axis of the transducer 107 is 90 degrees clockwise with respect to a 0 degree midpoint illustrated in FIG. 5(*b*), and the left ear of the listener is positioned closer to the ultrasonic transducer 107 than the right ear (this condition is hereinafter referred to as condition A). From this position, the listener gradually rotates anticlockwise 180 degrees until the angle with respect to the 0 degree midpoint is −90 degrees (condition after 180.degree. rotation is hereinafter referred to as condition C, and condition shown in FIG. 5(*b*), in which the listener is oriented such that the listener's front direction faces the transducer 107, is referred to as condition B).

FIG. 5(*d*) shows an example of the characteristics of frequency to sound pressure level of the self-demodulated sound entering the right ear of the listener for each of the conditions shown in FIGS. 5(*a*), (*b*) and (*c*). In FIG. 5(*d*), curve P1, curve P2, and curve P3 represent the characteristics of frequency to sound pressure level of the self-demodulated sound for the conditions in FIGS. 5(*a*), (*b*) and (*c*), respectively. As can be seen from FIG. 5(*d*), the sound pressure level of the self-demodulated sound in the audio frequency band gradually increases as the listener rotates anticlockwise from the condition A through the condition B to the condition C. The increase rate of the sound pressure level is greater at a lower frequency.

The characteristics of sound pressure level to frequency of the self-demodulated sound entering the left ear vary oppositely to the case of right ear discussed above. Thus, the ear of the listener X located closer to the ultrasonic transducer 107 senses the sound from the ultrasonic speaker as larger sound than the case of the ear located away from the ultrasonic transducer 107.

Considering these characteristics, the signal processing is carried out such that the ear of the listener X positioned closer to the ultrasonic transducer than the other ear can hear the sound waves with the optimum sound quality in this embodiment. For example, the signal processing is performed in such a manner as to provide desirable characteristics for the left ear when the listener is in the condition shown in FIG. 5(*a*), for either the right or left ear when the listener is in the condition shown in FIG. 5(*b*), and for the right ear when the listener is in the condition shown in FIG. 5(*c*).

Figure 6A:
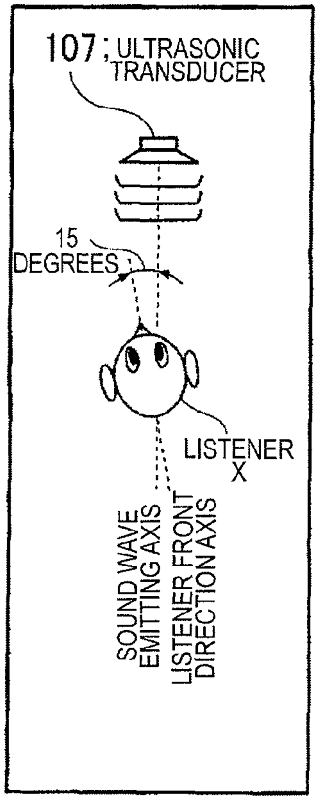
FIG. 6 illustrates respective conditions where an angle formed between the sound wave emitting axis of the ultrasonic transducer and an axis indicating the listener's front direction varies.
Figure 6B:
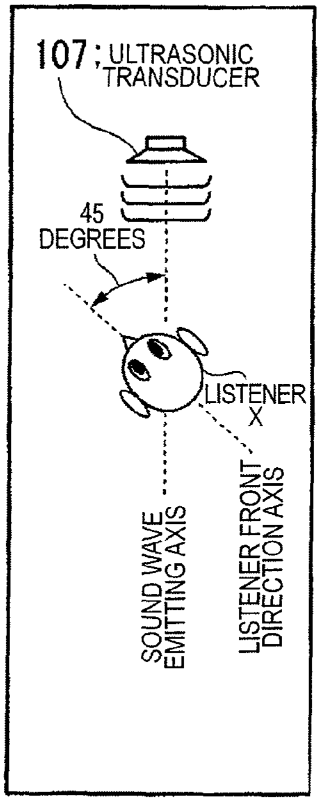
Figure 6C:
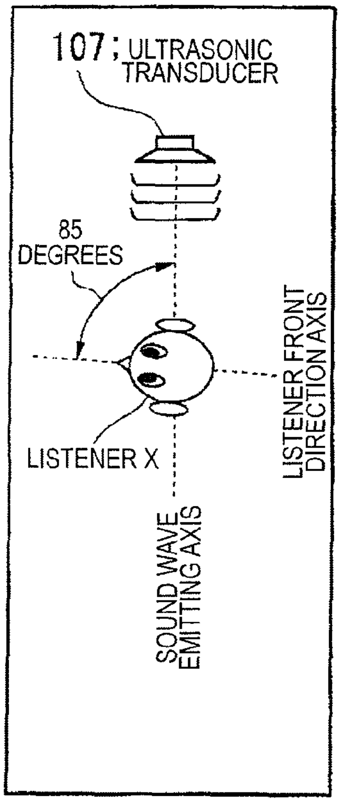

FIG. 6 shows the respective conditions when the angle formed between the sound wave emitting axis of the ultrasonic transducer and the axis indicating the front direction of the listener varies.

Figure 7:
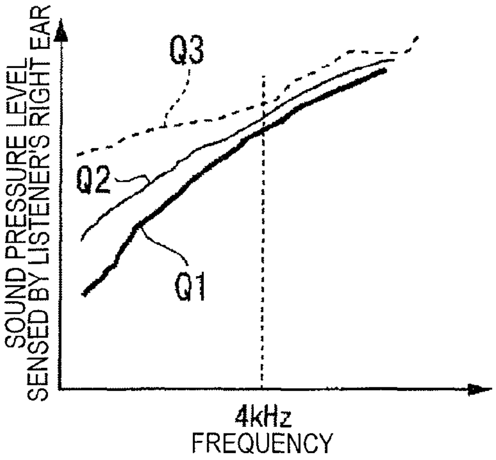
FIG. 7 shows an example of characteristics of sound pressure level to frequency sensed by the right ear of the listener X for the respective conditions shown in FIG. 6(*a*) through (*c*).

FIG. 7 shows an example of the characteristics of sound pressure level to frequency sensed by the right ear of the listener X when the listener X is in the conditions shown in FIG. 6(*a*) through (*c*). In the figure, curve Q1, curve Q2, and curve Q3 represent the characteristics in the conditions shown in FIG. 6(*a*), FIG. 6(*b*), and FIG. 6(*c*), respectively.

Figure 8:
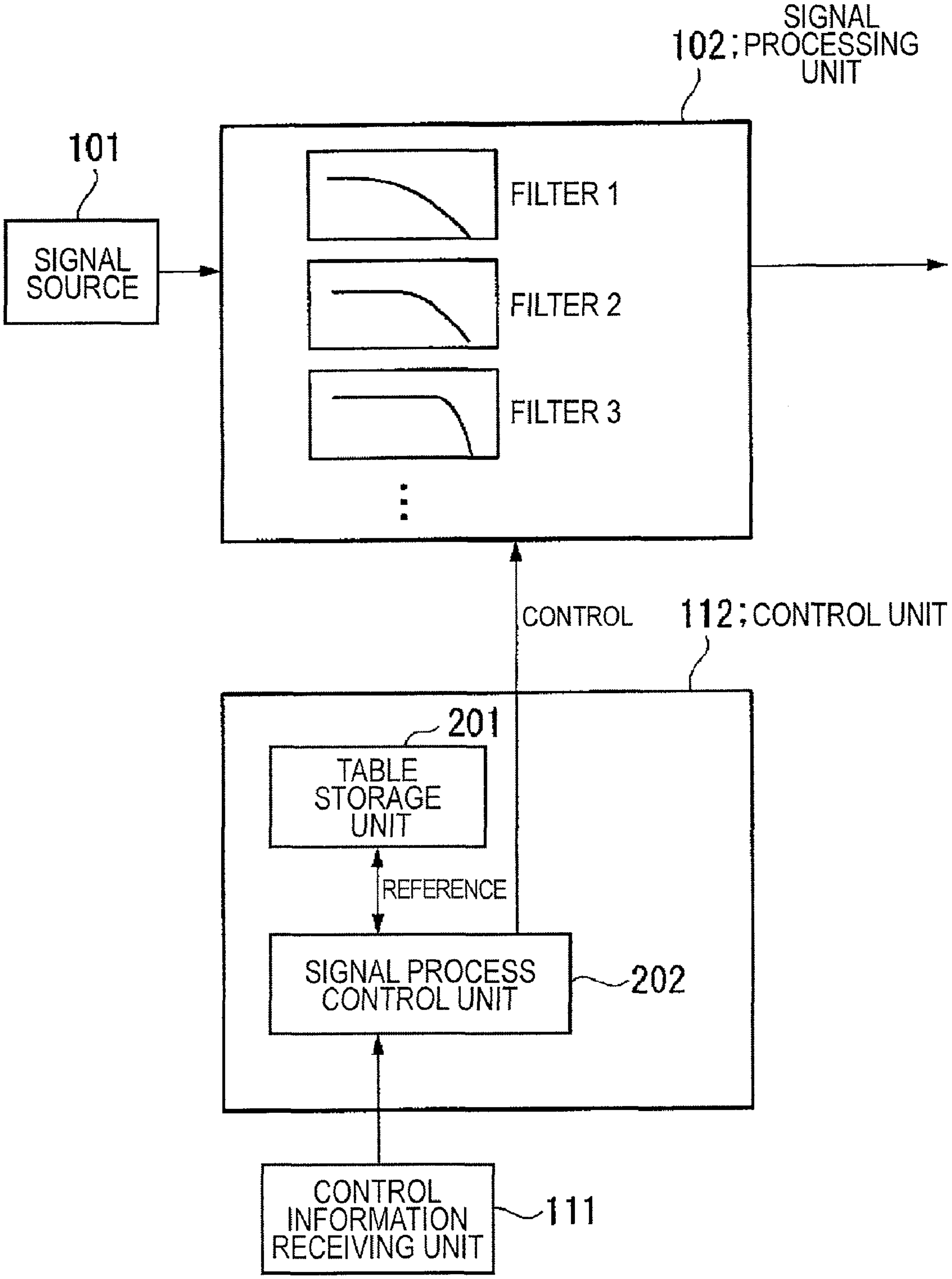
FIG. 8 is a block diagram showing a specific structure of a control unit in the ultrasonic speaker system shown in FIG. 1.

FIG. 8 illustrates a specific structure of the control unit 112. As can be seen from the figure, the control unit 112 has a table storage unit 201 and a signal process control unit 202. The table storage unit 201 stores a table showing the relations between the signal processing method executed by the signal processing unit 102 and the "listener angle information" and the "listener position information" included in the control information received by the control information receiving unit 111.

It is possible to obtain information about the direction of the axis indicating the front direction of the listener X from the "listener angle information", and information about the direction of the sound wave emitting axis of the ultrasonic transducer from the "listener position information". Thus, the angle formed between the sound wave emitting axis of the ultrasonic transducer and the axis indicating the listener's front direction is obtainable based on the "listener angle information" and the "listener position information". In this embodiment, an acute angle of the listener angle is measured. When controlling the contents of the signal processing applied to the audio signal outputted from the signal source 101, the signal process control unit 202 refers to the table mentioned above based on the "listener angle information" and the "listener position information" included in the control information obtained by the control information receiving unit 111 to determine the contents of the signal processing (filtering process) applied to the audio signal outputted from the signal source 101 and control the signal processing unit 102.

As illustrated in FIG. 8, the signal processing unit 102 has a plurality of desired filters prepared beforehand in accordance with each angle formed between the sound wave emitting axis of the ultrasonic transducer 107 and the axis indicating the front direction of the listener X. One of the plural filters is selected under the control of the signal process control unit 202. In this embodiment, the plural filters are referred to as filter 1, filter 2, and subsequent filters.

A specific example of the table 201 is now discussed. The "listener position information" is information about an axis indicating a certain reference direction, and is transmitted as a digital signal from the control information transmitting unit 110 by 1 degree. The "listener position information" is information about an angle formed between another reference axis different from the above reference axis (for example, sound wave emitting axis under the condition where the ultrasonic transducer 107 is located at the maximum angle when the range of angle variations of the ultrasonic transducer 107 is limited) and an axis connecting the center position of the ultrasonic transducer 107 and the position of the listener X, and is transmitted as a digital signal from the control information transmitting unit 110 by 1 degree.

Thus, the acute angle for each angle formed between the sound wave emitting axis of the ultrasonic transducer 107 and the axis indicating the front direction of the listener X can be calculated from the two types of digital signal information of the "listener angle information" and the "listener position information".

As shown in FIG. 11, the table stored in the table storage unit 201 is prepared such that the signal process control unit 202 outputs a signal "001" for selecting the filter 1 when the angle obtained by the above two digital signals lies in the range from 0 to 22 degrees (example shown in FIG. 6(*a*)), a signal "010" for selecting the filter 2 when the angle lies in the range from 23 to 67 degrees (example shown in FIG. 6(*b*)), and a signal "011" for selecting the filter 3 when the angle lies in the range from 68 to 90 degrees (example shown in FIG. 6(*c*) in this embodiment.

Figure 9A:
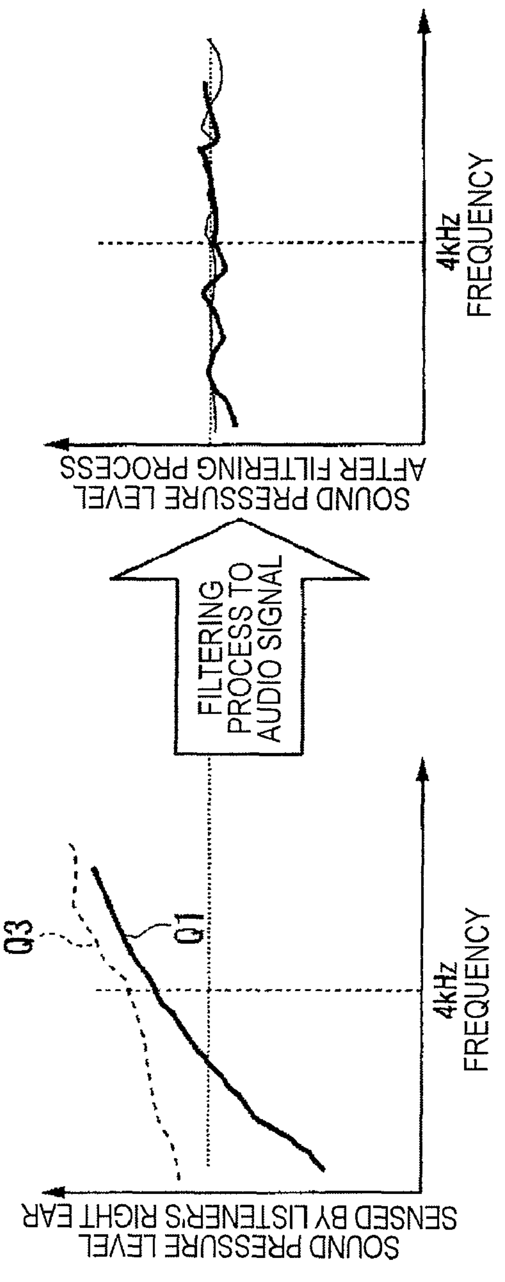
FIG. 9 shows an example of the relationship between the characteristics of frequency to sound pressure level and filter characteristics for obtaining desired output characteristics in the ultrasonic speaker system.
Figure 9B:
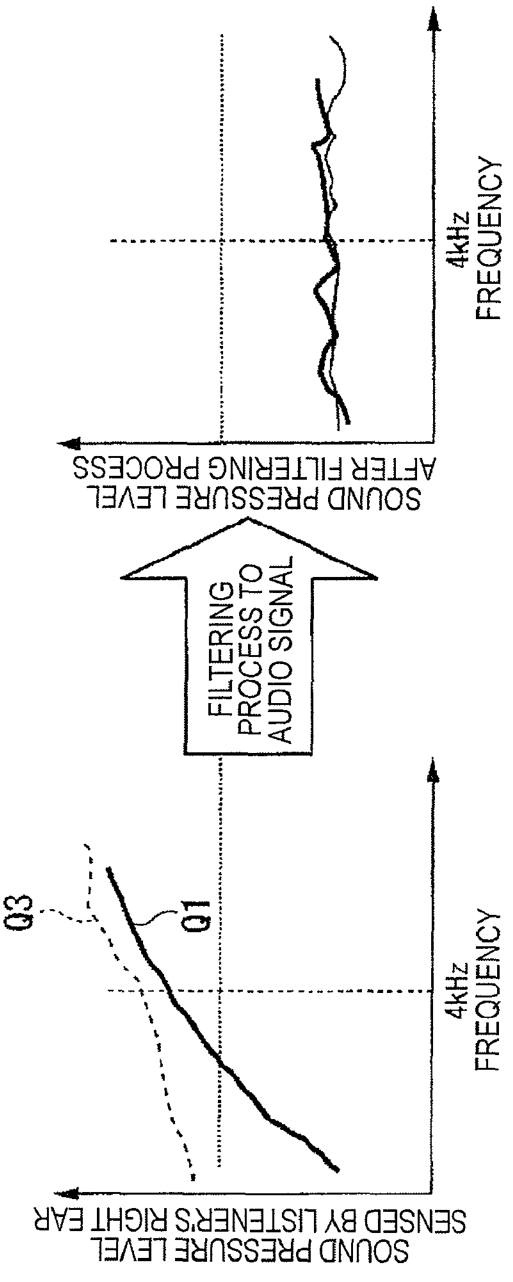

An example of the method for manufacturing the filter (prepared in the signal processing unit 102 in advance) which provides the optimum sound quality for the listener X when the listener X is in the conditions shown in FIGS. 6(*a*) and (*c*) is now described. Initially, the respective filters are manufactured such that the frequency characteristics (curve Q1 for the case in FIG. 6(*a*), and curve Q3 for the case in FIG. 6(*c*)) sensed by the right ear of the listener X become constant at arbitrary sound pressure levels for the respective conditions shown in FIGS. 6(*a*) and (*c*) as illustrated in FIG. 9(*a*).

By this process, more desirable sound quality can be given to the listener X. Since most of the ultrasonic speakers currently available have no margin for the maximum output value, the characteristics of sound pressure level to frequency indicated by the curve Q1 in FIG. 9(*a*) need to be raised in the middle and low bands. It is difficult, however, to carry out this raising process for the reason discussed above, and it is thus difficult to establish the arbitrary sound pressure levels at larger values. That is, when the frequency characteristics of the self-demodulated sound is made completely flat according to the current performance of the ultrasonic transducer, the condition shown in FIG. 9(*b*), where the outputted sound volume is small, is caused.

Figure 10:
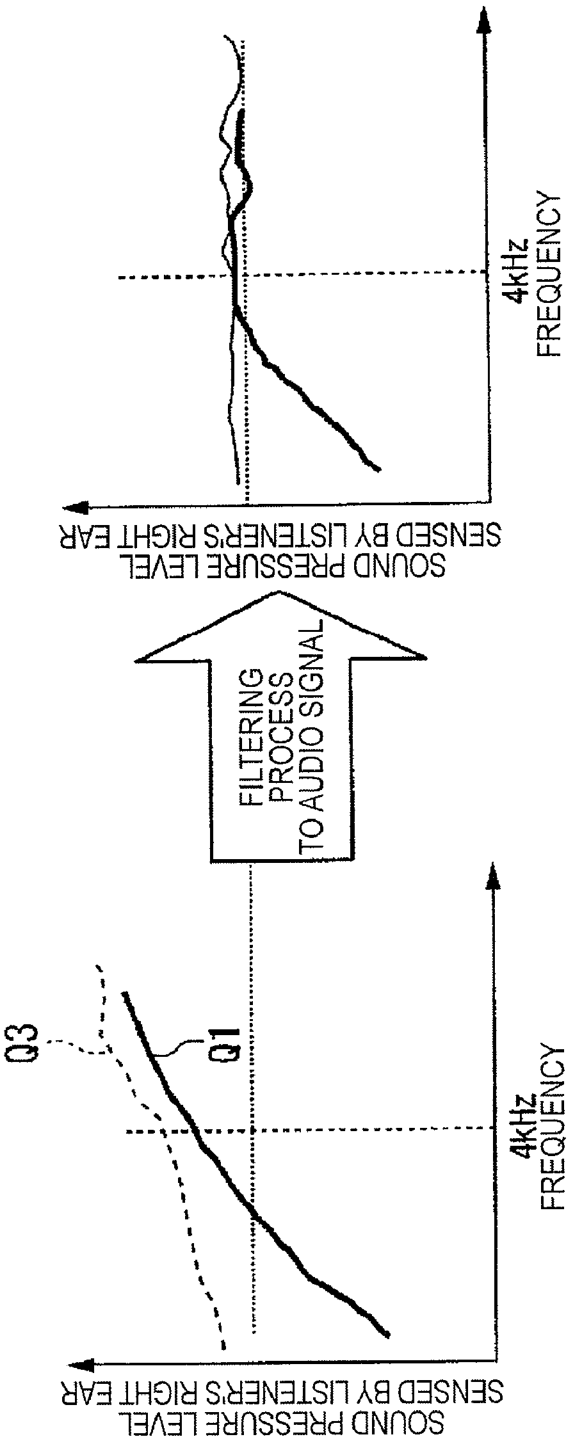
FIG. 10 illustrates another example of the relationship between the characteristics of frequency to sound pressure level and the filter characteristics for obtaining the desired output characteristics in the ultrasonic speaker system.

Therefore, the filters for flatting the frequency characteristics felt by the listener for the cases in FIGS. 7(*a*) and (*b*) in a frequency band equivalent to or higher than a frequency arbitrarily determined are prepared as shown in FIG. 10. For example, in case of the frequency characteristics indicated by the curve Q1 in FIG. 10, the highest possible sound pressure is outputted in a band lower than 1 kHz, and the same sound pressure level as the level to be outputted at 1 kHz is outputted in a band equivalent to or higher than 1 kHz.

In case of the frequency characteristics indicated by the curve Q3 in FIG. 10, the highest possible sound pressure is outputted in a band lower than 0.1 kHz, and the same sound pressure level as the level to be outputted at 0.1 kHz is outputted in a band equivalent to or higher than 0.1 kHz. When executing this process, it should be noted that such an arbitrary frequency is selected that secures a certain sound pressure level and does not provide excessively high pressure level in the middle to high band with respect to the middle to low band. By designing the filters while considering this point, the optimum sound quality (considering the performance of the speaker) can be provided for the listener X.

The control unit 112 selects the appropriate filter from the plural filters prepared as above based on the angle information about the listener X with respect to the sound wave emitting axis of the ultrasonic transducer 107 and the position information with respect to the ultrasonic transducer 107, and mounts the selected filter on the signal processing unit 102. The audio signal passing through the filter mounted on the signal processing unit 102 modulates the carrier waves in the modulating circuit 105. The modulated waves obtained in the modulating circuit 105 are amplified in the modulated wave amplitude adjusting circuit 106, and outputted from the ultrasonic transducer 107.

By using the system shown in FIG. 1 according to the steps described above, the optimum sound quality can be constantly provided for the listener even when the listener changes the angle formed between the sound wave emitting axis of the ultrasonic transducer and the axis indicating the listener's front direction.

The invention claimed is:

1. A method for controlling output from an ultrasonic speaker, comprising: modulating carrier waves by signal waves that generates signal waves in an audio frequency band outputted from a signal source; and driving an ultrasonic transducer by the modulated waves, wherein signal processing is applied to the signal waves in the audio frequency band according to an angle formed between a first plane that contains a sound wave emitting axis of the ultrasonic transducer and that is normal to a reference floor plane and a second plane that contains an axis indicating a listener's front direction and that is normal to the reference floor plane such that frequency characteristics of a signal sound in the audio frequency band which is self-demodulated when emitted from the ultrasonic speaker are made flat for each angle in a predetermined range of angles formed between the first plane containing the sound wave emitting axis and the second plane containing the axis indicating the listener's front direction, and wherein the predetermined range of angles ranges from 90 degrees to −90 degrees, a 0 degree midpoint of the predetermined range corresponding to an orientation of the listener in which the listener's front direction faces the ultrasonic transducer.

2. The method for controlling output from the ultrasonic transducer according to claim 1, wherein the ultrasonic speaker includes an angle measuring unit that measures an angle formed between a third plane that contains an axis indicating an arbitrary reference direction and that is normal to the reference floor plane and the second plane containing the axis indicating the listener's front direction, and the signal processing is applied based on a measurement result of the angle measuring unit.

3. The method for controlling output from the ultrasonic transducer according to claim 2, further comprising:

a sound wave emitting axis direction varying unit that arbitrarily varies the direction of the sound wave emitting axis; and a position determining unit that determines the position of the listener with respect to the ultrasonic transducer, wherein the sound wave emitting axis direction varying unit controls the direction of the sound wave emitting axis such that the sound wave emitting axis crosses the listener based on a measurement result of the position determining unit, and the signal processing is performed based on the measurement result of the angle measuring unit and the measurement result of the position determining unit.

4. The method for controlling output from the ultrasonic transducer according to claim 1, wherein the signal processing is performed such that the frequency characteristics of the signal sound in the audio frequency band which is self-demodulated when emitted from the ultrasonic speaker can be made flat in a band equivalent to or higher than a frequency according to each angle in the predetermined range of angles formed between the first plane and the second plane.

5. An ultrasonic speaker system, comprising:

a signal source that generates signal waves in an audio frequency band;

a signal processing unit that applies signal processing to the signal waves;

a signal wave amplitude adjusting circuit that adjusts amplitude of the signal waves;

a carrier wave generating source that generates and outputs carrier waves in an ultrasonic frequency band;

a modulating circuit that modulates the carrier waves by the signal waves in the audio frequency band outputted from the signal source;

a modulated wave amplitude adjusting circuit that adjusts amplitude of the modulated waves produced by the modulating circuit;

an ultrasonic transducer driven by the modulated waves whose amplitude is adjusted by the modulated wave amplitude adjusting circuit;

an angle measuring unit that measures a listener angle as an angle formed between a first plane that contains an axis indicating an arbitrary reference direction and that is normal to a reference floor plane and a second plane that contains an axis indicating a listener's front direction and that is normal to the reference floor plane;

a control information transmitting unit that transmits control information including listener angle information obtained by the angle measuring unit;

a control information receiving unit that receives the control information; and a control unit that controls the signal processing performed by the signal processing unit based on the listener angle information included in the control information, wherein the signal processing unit executes the signal processing based on the listener angle information such that frequency characteristics of a signal sound in the audio frequency band which is self-demodulated when emitted from the ultrasonic speaker are made flat for each angle in a predetermined range of angles formed between a third plane that contains a sound wave emitting axis of the ultrasonic transducer and that is normal to the reference floor plane and the second plane containing the axis indicating the listener's front direction, wherein the predetermined range of angles ranges from 90 degrees to −90 degrees, a 0 degree midpoint of the predetermined range corresponding to an orientation of the listener in which the listener's front direction faces the ultrasonic transducer.

6. The ultrasonic speaker system according to claim 5, wherein:

the control unit includes a table storage unit that stores a table showing the relation between the listener angle information included in the control information and the signal processing performed by the signal processing unit; and the control unit refers to the table based on the listener angle information to determine the contents of the signal processing when controlling the signal processing.

7. The ultrasonic speaker system according to claim 5, wherein:

the signal processing unit has a plurality of filters prepared in correspondence with the listener angle information; and the control unit selects one of the plural filters.

8. The ultrasonic speaker system according to claim 7, wherein each of the plural filters is prepared in correspondence with the listener angle information such that the frequency characteristics of the signal sound in the audio frequency band which is self-demodulated when emitted from the ultrasonic speaker can be made flat for the corresponding angle formed between the third plane containing the sound wave emitting axis of the ultrasonic transducer and the second plane containing the axis indicating the listener's front direction.

9. The ultrasonic speaker system according to claim 5, wherein the signal processing unit executes the signal processing based on the listener angle information such that the frequency characteristics of the signal sound in the audio frequency band which is self-demodulated when emitted from the ultrasonic speaker can be made flat in a band equivalent to or higher than a frequency according to the angle formed between the third plane containing the sound wave emitting axis of the ultrasonic transducer and the second plane containing the axis indicating the listener's front direction.

10. The ultrasonic speaker system according to claim 7, wherein each of the plural filters is prepared in correspondence with the listener angle information such that the frequency characteristics of the signal sound in the audio frequency band which is self-demodulated when emitted from the ultrasonic speaker can be made flat in a band equivalent to or higher than a frequency according to the corresponding angle formed between the third plane containing the sound wave emitting axis of the ultrasonic transducer and the second plane containing the axis indicating the listener's front direction.

11. The ultrasonic speaker system according to claim 5, further comprising:

an angle varying mechanism that arbitrarily varies an angle of the sound wave emitting axis of the ultrasonic transducer;

a position determining unit that determines a listener position as a position of the listener with respect to the ultrasonic transducer; and an angle control unit that controls the operation of the angle varying mechanism such that the angle of the ultrasonic transducer can be varied based on listener position information obtained by the position determining unit and contained in the control information transmitted from the control information transmitting unit, wherein the control unit controls the signal processing based on the two types of information of the listener angle information and the listener position information.

12. The ultrasonic speaker system according to claim 11, wherein:

the control unit includes a table storage unit that stores a table showing the relation between the signal processing performed by the signal processing unit and the listener angle information and the listener position information contained in the control information; and the control unit refers to the table based on the listener angle information the listener position information contained in the control information to determine the contents of the signal processing when controlling the signal processing.

13. The ultrasonic speaker system according to claim 11, wherein:

the signal processing unit has a plurality of filters prepared in correspondence with the listener angle information and the listener position information contained in the control information; and the control unit selects one of the plural filters when executing the signal processing.

14. The ultrasonic speaker system according to claim 11, wherein the signal processing unit executes the signal processing based on the listener angle information and the listener position information such that frequency characteristics of a signal sound in the audio frequency band which is self-demodulated when emitted from the ultrasonic speaker can be made flat for the angle formed between the third plane containing the sound wave emitting axis of the ultrasonic transducer and the second plane containing the axis indicating the listener's front direction.

15. The ultrasonic speaker system according to claim 13, wherein the plural filters are prepared in correspondence with the listener angle information and the listener position information such that the frequency characteristics of the signal sound in the audio frequency band which is self-demodulated when emitted from the ultrasonic speaker can be made flat for the angle formed between the third plane containing the sound wave emitting axis of the ultrasonic transducer and the second plane containing the axis indicating the listener's front direction.

16. The ultrasonic speaker system according to claim 11, wherein the signal processing unit executes the signal processing based on the listener angle information and the listener position information such that the frequency characteristics of the signal sound in the audio frequency band which is self-demodulated when emitted from the ultrasonic speaker can be made flat in a band equivalent to or higher than a frequency according to the angle formed between the third plane containing the sound wave emitting axis of the ultrasonic transducer and the second plane containing the axis indicating the listener's front direction.

17. The ultrasonic speaker system according to claim 13, wherein the plural filters are prepared in correspondence with the listener angle information and the listener position information such that the frequency characteristics of the signal sound in the audio frequency band which is self-demodulated when emitted from the ultrasonic speaker can be made flat in a band equivalent to or higher than a frequency according to the angle formed between the third plane containing the sound wave emitting axis of the ultrasonic transducer and the second plane containing the axis indicating the listener's front direction.

* * * * *